United States Patent
Katou

(10) Patent No.: US 8,755,448 B2
(45) Date of Patent: Jun. 17, 2014

(54) DATA RECEIVING DEVICE, SEMICONDUCTOR INTEGRATED CIRCUIT, AND METHOD FOR CONTROLLING DATA RECEIVING DEVICE

(75) Inventor: Manabu Katou, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 50 days.

(21) Appl. No.: 13/489,602

(22) Filed: Jun. 6, 2012

(65) Prior Publication Data

US 2012/0314817 A1 Dec. 13, 2012

(30) Foreign Application Priority Data

Jun. 13, 2011 (JP) .................... 2011-131108

(51) Int. Cl.
*H04B 3/00* (2006.01)
*H04L 25/00* (2006.01)

(52) U.S. Cl.
USPC .......................................... 375/257

(58) Field of Classification Search
USPC ........................ 375/257; 455/343.4
See application file for complete search history.

(56) References Cited

U.S. PATENT DOCUMENTS

| 5,410,734 A * | 4/1995 | Choi et al. ................... 340/7.34 |
| 2011/0268198 A1* | 11/2011 | Nishioka et al. .............. 375/257 |

FOREIGN PATENT DOCUMENTS

| JP | 11-205412 A | 7/1999 |
| JP | 2004-72225 A | 3/2004 |
| JP | 2006-135397 A | 5/2006 |

* cited by examiner

*Primary Examiner* — Chieh M Fan
*Assistant Examiner* — Wednel Cadeau
(74) *Attorney, Agent, or Firm* — Miles & Stockbridge P.C.

(57) ABSTRACT

A data receiving device capable of reducing power consumption. A data receiving device according to the present invention has a receiving circuit and a power reduction circuit. The receiving circuit includes a receiver for receiving differential signals, a decode circuit, and a control circuit. The power reduction circuit puts the receiver into an on state in accordance with timing of a data reception start by the receiving circuit, and puts the receiver into an off state in accordance with timing of a data reception end by the receiving circuit. Further, the control circuit puts the power reduction circuit into an off state in accordance with the timing of the data reception start by the receiving circuit, and puts the power reduction circuit into an on state in accordance with the timing of the data reception end by the receiving circuit.

5 Claims, 13 Drawing Sheets

DATA RECEIVING DEVICE, SEMICONDUCTOR INTEGRATED CIRCUIT, AND METHOD FOR CONTROLLING DATA RECEIVING DEVICE

CROSS-REFERENCE TO RELATED APPLICATIONS

The disclosure of Japanese Patent Application No. 2011-131108 filed on Jun. 13, 2011 including the specification, drawings and abstract is incorporated herein by reference in its entirety.

BACKGROUND

The present invention relates to a data receiving device, a semiconductor integrated circuit, and a method for controlling a data receiving device, and in particular, relates to a data receiving device, a semiconductor integrated circuit, and a method for controlling a data receiving device that can reduce power consumption.

There is a data transfer system using differential signals. This data transfer system using differential signals is used in a high-speed serial interface such as USB (Universal Serial Bus), HDMI (High-Definition Multimedia Interface), MIPI (Mobile Industry Processor Interface), and the like.

Japanese Unexamined Patent Publication No. Hei 11 (1999)-205412 (Patent Document 1) discloses a technique related to a USB controller capable of reducing power consumption. FIG. 13 is a diagram showing the configuration of the USB controller disclosed in Patent Document 1. The USB controller shown in FIG. 13 includes a Root_HUB 132 and an I/O buffer 133.

The Root_HUB 132 includes a port state circuit 151 and a port monitor circuit 161. The port state circuit 151 outputs a port status signal P_SUS by host software control. Whether or not data is being transferred through the use of the USB controller is managed by host software based on a signal from the port monitor circuit 161.

Registers 152 and 153 are configuration registers provided in the USB controller and can be accessed by a CPU. Irrespective of the port status signal P_SUS from the port state circuit 151, power-down control information for on/off control of a differential input buffer 159 is written to the register 153 by software. When power-down control information indicating the off control of the differential input buffer 159 is written to the register 153 by software, an output signal EMPD of the register 153 is set to "H".

Selection information for selecting either on/off control of the differential input buffer 159 using the port status signal P_SUS from the port state circuit 151 or on/off control of the differential input buffer 159 using the power-down control information in the register 153 is written to the register 152 by software. When selection information indicating the selection of on/off control of the differential input buffer 159 using the port status signal P_SUS is written to the register 152, an output signal EAPD of the register 152 becomes "H". Then, the port status signal P_SUS is outputted from the output of an AND gate 155, and supplied as a suspend signal SUSP through an OR gate 157 to the I/O buffer 133.

When selection information indicating the selection of on/off control of the differential input buffer 159 using the power-down control information in the register 153 is written to the register 152, the output signal EAPD of the register 152 becomes "L". Then, an inverter 154 inverts the signal from "L" to "H", which is supplied to one input of an AND gate 156. Therefore, the signal EMPD is outputted from the output of the AND gate 156, and supplied as the suspend signal SUSP through the OR gate 157 to the I/O buffer 133.

The suspend signal SUSP is used for operation control of output buffers 158a and 158b and the differential input buffer 159 in the I/O buffer 133. The logical OR by an OR circuit 160 between a transmission enable signal TXENB and the suspend signal SUSP is sent to the control terminals of the low-active output buffers 158a and 158b. Further, the suspend signal SUSP is directly sent to the control terminal of the low-active differential input buffer 159. The transmission enable signal TXENB is a signal which becomes "L" when the USB controller outputs data to a USB device. Reference symbol USBRCV denotes an output signal of the differential input buffer 159.

In the technique disclosed in Patent Document 1, the on/off control of the differential input buffer 159 in the USB controller using the Root_HUB 132 reduces the power consumption of the USB controller.

Japanese Unexamined Patent Publication No. 2006-135397 (Patent Document 2) discloses a technique for reducing the power consumption of a data transfer control device. Japanese Unexamined Patent Publication No. 2004-72225 (Patent Document 3) discloses a technique for reducing the power consumption of a USB controller.

SUMMARY

In the technique disclosed in Patent Document 1, the port monitor circuit 161 monitors the state of a serial bus ($D^+$, $D^-$). When data is not transferred through the serial bus ($D^+$, $D^-$), the differential input buffer 159 is put into an off state, thereby reducing the power consumption of the USB controller.

However, in the technique disclosed in Patent Document 1, the port monitor circuit 161 is always in the on state to monitor the state of the serial bus ($D^+$, $D^-$). Accordingly, the port monitor circuit 161 always consumes power, which disadvantageously leads to insufficient reduction in the power consumption of the USB controller.

A data receiving device according to one aspect of the present invention has a receiving circuit including a receiver that receives differential signals, a decode circuit that decodes a signal outputted from the receiver, and a control circuit to which data outputted from the decode circuit is supplied and a power reduction circuit that reduces power consumption of the receiving circuit. The power reduction circuit puts the receiver into an on state in accordance with timing of a data reception start by the receiving circuit, and puts the receiver into an off state in accordance with timing of a data reception end by the receiving circuit, and the control circuit puts the power reduction circuit into an off state in accordance with the timing of the data reception start by the receiving circuit, and puts the power reduction circuit into an on state in accordance with the timing of the data reception end by the receiving circuit.

In the data receiving device according to the aspect of the invention, the power reduction circuit puts the receiver into the on state in accordance with the timing of the data reception start by the receiving circuit, and puts the receiver into the off state in accordance with the timing of the data reception end by the receiving circuit. Further, the control circuit in the receiving circuit puts the power reduction circuit into the off state in accordance with the timing of the data reception start by the receiving circuit, and puts the power reduction circuit into the on state in accordance with the timing of the data reception end by the receiving circuit. Therefore, it is possible to put the power reduction circuit into the off state in addition to the receiver and accordingly reduce the power consumption of the data receiving device.

A method for controlling a data receiving device according to another aspect of the invention having a receiving circuit including a receiver that receives differential signals, a decode circuit that decodes a signal outputted from the receiver, and a control circuit to which data outputted from the decode circuit is supplied and a power reduction circuit that reduces power consumption of the receiving circuit. In the method, the power reduction circuit puts the receiver into an on state in accordance with timing of a data reception start by the receiving circuit, and puts the receiver into an off state in accordance with timing of a data reception end by the receiving circuit, and the control circuit puts the power reduction circuit into an off state in accordance with the timing of the data reception start by the receiving circuit, and puts the power reduction circuit into an on state in accordance with the timing of the data reception end by the receiving circuit.

In the method for controlling the data receiving device according to the aspect of the invention, the power reduction circuit puts the receiver into the on state in accordance with the timing of the data reception start by the receiving circuit, and puts the receiver into the off state in accordance with the timing of the data reception end by the receiving circuit. Further, the control circuit in the receiving circuit puts the power reduction circuit into the off state in accordance with the timing of the data reception start by the receiving circuit, and puts the power reduction circuit into the on state in accordance with the timing of the data reception end by the receiving circuit. Therefore, it is possible to put the power reduction circuit into the off state in addition to the receiver and accordingly reduce the power consumption of the data receiving device.

According to the aspects of the invention, it is possible to provide the data receiving device, the semiconductor integrated circuit, and the method for controlling the data receiving device that can reduce power consumption.

DETAILED DESCRIPTION

First, the gist of the present invention will be described. A data receiving device according to the invention has a receiving circuit and a power reduction circuit for reducing power consumption of the receiving circuit. The receiving circuit includes a receiver for receiving differential signals, a decode circuit for decoding a signal outputted from the receiver, and a control circuit to which data outputted from the decode circuit is supplied.

The power reduction circuit puts the receiver into an on state in accordance with timing of a data reception start by the receiving circuit, and puts the receiver into an off state in accordance with timing of a data reception end by the receiving circuit. That is, since it is not necessary to operate the receiving circuit when the receiving circuit does not receive data, the power reduction circuit puts the receiving circuit into the off state. This can reduce the power consumption of the receiving circuit during standby.

Further, the control circuit in the receiving circuit puts the power reduction circuit into an off state in accordance with the timing of the data reception start by the receiving circuit, and puts the power reduction circuit into an on state in accordance with the timing of the data reception end by the receiving circuit. That is, since it is necessary to operate the receiving circuit when the receiving circuit receives data, the power reduction circuit does not need to put the receiving circuit into the off state. Accordingly, when the receiving circuit receives data, that is, the power reduction circuit does not need to operate, the control circuit puts the power reduction circuit into the off state, which can reduce the power consumption of the power reduction circuit.

Thus, in the data receiving device according to the invention, it is possible to put the power reduction circuit into the off state in addition to the receiver in the receiving circuit and accordingly reduce the power consumption of the data receiving device.

In preferred embodiments of the invention, the following three cases will be described as aspects of putting the power reduction circuit into the off state.
(1) In the case of putting single-end buffers 21 and 22 in the power reduction circuit into the off state (First Embodiment: see FIG. 1)
(2) In the case of putting the single-end buffers 21 and 22 and a state monitoring circuit 23' in the power reduction circuit into the off state (Second Embodiment: see FIG. 5)
(3) In the case of putting an enable signal generation circuit 61, 61' in the power reduction circuit into the off state (Third and Fourth Embodiments: see FIGS. 6, 11)

Figure 1:
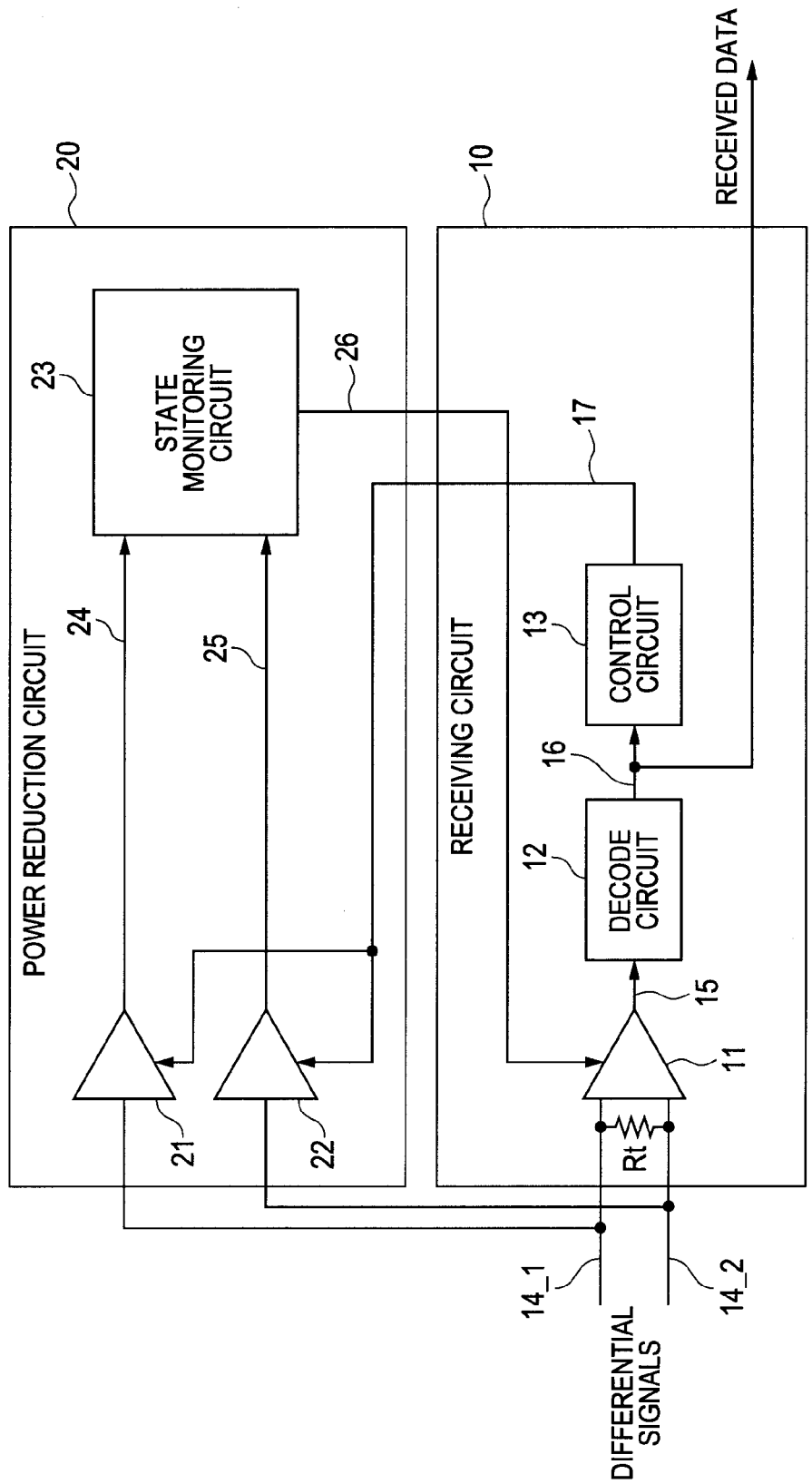
FIG. 1 is a block diagram showing a data receiving device according to a first embodiment.

Hereinafter, preferred embodiments of the invention will be described with reference to the accompanying drawings.
First Embodiment
FIG. 1 is a block diagram showing a data receiving device according to a first embodiment. The data receiving device shown in FIG. 1 has a receiving circuit 10 and a power reduction circuit 20. The receiving circuit 10 includes a receiver 11, a decode circuit 12, and a control circuit 13.

The receiver 11 receives differential signals 14_1 and 14_2, and outputs a signal 15 of a high level or a low level in accordance with the differential signals 14_1 and 14_2. For example, when the differential signal 14_1 is at the high level and the differential signal 14_2 is at the low level, the receiver 11 outputs the signal 15 of the high level. On the other hand, when the differential signal 14_1 is at the low level and the differential signal 14_2 is at the high level, the receiver 11 outputs the signal 15 of the low level. A termination resistor Rt is provided on the input side of the receiver 11.

Further, an enable signal 26 outputted from a state monitoring circuit 23 in the power reduction circuit 20 is supplied to the receiver 11. The receiver 11 becomes an on state at the high level of the enable signal 26. At this time, the receiver 11 receives the differential signals 14_1 and 14_2, and outputs the signal 15 of the high level or the low level in accordance with the differential signals 14_1 and 14_2. On the other hand, the receiver 11 becomes an off state at the low level of the enable signal 26. At this time, the receiver 11 does not output the signal 15. Further, besides the above example, the receiver 11 may become the on state at the low level of the enable signal 26, and become the off state at the high level of the enable signal 26.

The decode circuit 12 decodes the signal 15 outputted from the receiver 11. That is, the decode circuit 12 decodes the signal 15 transferred by the differential signals 14_1 and 14_2 into data having a predetermined bit length. Data 16 decoded by the decode circuit 12 is supplied to the control circuit 13, and outputted to a subsequent external circuit (not shown).

The control circuit 13 puts the power reduction circuit 20 into the off state in accordance with the timing of a data reception start by the receiving circuit 10, and puts the power reduction circuit 20 into the on state in accordance with the timing of a data reception end by the receiving circuit 10. In other words, the control circuit 13 puts the power reduction circuit 20 into the off state in accordance with the timing at which data is contained in the differential signals 14_1 and 14_2, and puts the power reduction circuit 20 into the on state in accordance with the timing at which data is not contained in the differential signals 14_1 and 14_2. In this context, the case where data is contained in the differential signals 14_1 and 14_2 refers to the case where data is transferred to the data receiving device from an external data transmitting device (not shown), using the differential signals 14_1 and 14_2. On the other hand, the case where data is not contained in the differential signals 14_1 and 14_2 refers to, for example, the case where the differential signals 14_1 and 14_2 are fixed. In the case where data is contained in the differential signals 14_1 and 14_2, the decode circuit 12 outputs the decoded data 16. On the other hand, in the case where data is not contained in the differential signals 14_1 and 14_2, the decode circuit 12 does not output the data 16.

Specifically, the control circuit 13 outputs an enable signal 17 of the high level to single-end buffers 21 and 22 in the power reduction circuit 20, thereby putting the single-end buffers 21 and 22 into the on state (i.e., the power reduction circuit 20 into the on state). Further, the control circuit 13 outputs the enable signal 17 of the low level to the single-end buffers 21 and 22 in the power reduction circuit 20, thereby putting the single-end buffers 21 and 22 into the off state (i.e., the power reduction circuit 20 into the off state). Further, besides the above example, the single-end buffers 21 and 22 may become the on state at the low level of the enable signal 17, and become the off state at the high level of the enable signal 17.

Figure 2:
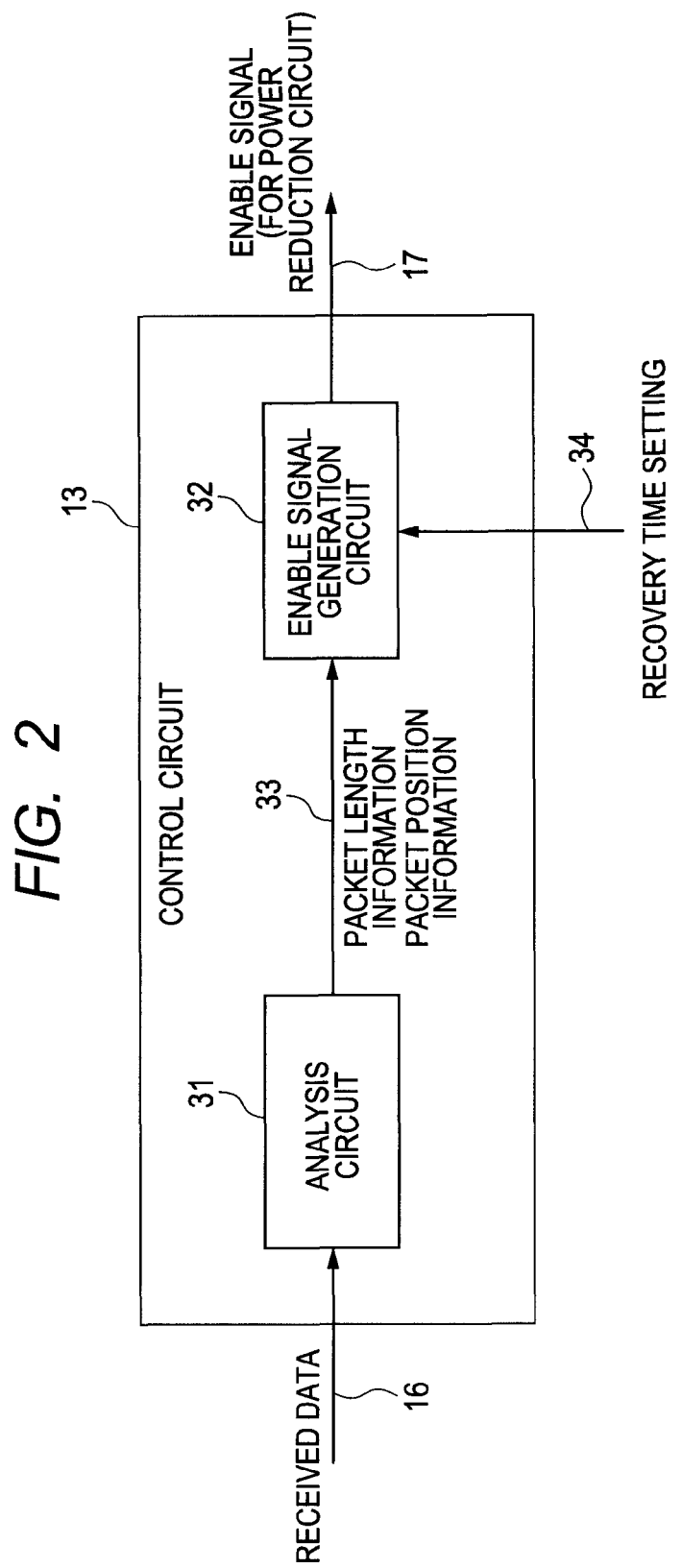
FIG. 2 is a block diagram showing an example of a control circuit in the data receiving device according to the first embodiment.

FIG. 2 is a block diagram showing an example of the control circuit 13. As shown in FIG. 2, the control circuit 13 has an analysis circuit 31 and an enable signal generation circuit (first enable signal generation circuit) 32. The analysis circuit 31 analyzes the packet of the data 16 outputted from the decode circuit 12 and thereby acquires information about the packet length of the data 16 and the packet position of the currently-received data 16. For example, the analysis circuit 31 analyzes a header contained in the data 16 and thereby acquires information about the overall packet length of the data 16. Further, the analysis circuit 31 analyzes what number bit the data 16 outputted from the decode circuit 12 is and thereby acquires information about the packet position.

The enable signal generation circuit 32 generates the enable signal 17, based on information 33 (information about the packet length and the packet position) outputted from the analysis circuit 31 and a recovery time 34 set by a CPU (not shown) or the like.

Specifically, the enable signal generation circuit 32 generates the enable signal 17 for putting the single-end buffers 21 and 22 into the off state if the packet length acquired by the analysis circuit 31 is greater than a predetermined packet length.

Further, the enable signal generation circuit 32 generates the enable signal 17 for putting the single-end buffers 21 and 22 into the on state when the packet position acquired by the analysis circuit 31 has reached a position a predetermined time before the timing of the data reception end. In this context, the position the predetermined time before the timing of the data reception end corresponds to the recovery time of the power reduction circuit 20.

The power reduction circuit 20 shown in FIG. 1 is a circuit for reducing the power consumption of the receiving circuit 10. The power reduction circuit 20 puts the receiver 11 into the on state in accordance with the timing of the data reception start by the receiving circuit 10, and puts the receiver 11 into the off state in accordance with the timing of the data reception end by the receiving circuit 10. In other words, the power reduction circuit 20 puts the receiver 11 into the on state in accordance with the timing at which data is contained in the differential signals 14_1 and 14_2, and puts the receiver 11 into the off state in accordance with the timing at which data is not contained in the differential signals 14_1 and 14_2.

Specifically, the power reduction circuit 20 includes the single-end buffer 21 to which one of the differential signals is supplied, the single-end buffer 22 to which the other differential signal is supplied, and the state monitoring circuit 23 which puts the receiver 11 into the on state or the off state in accordance with output from the single-end buffers 21 and 22. The state monitoring circuit 23 puts the receiver 11 into the on state if signals 24 and 25 outputted from the single-end buffers 21 and 22 indicate the data reception start. Further, the state monitoring circuit 23 puts the receiver 11 into the off state if the signals 24 and 25 outputted from the single-end buffers 21 and 22 indicate the data reception end.

Figure 4:
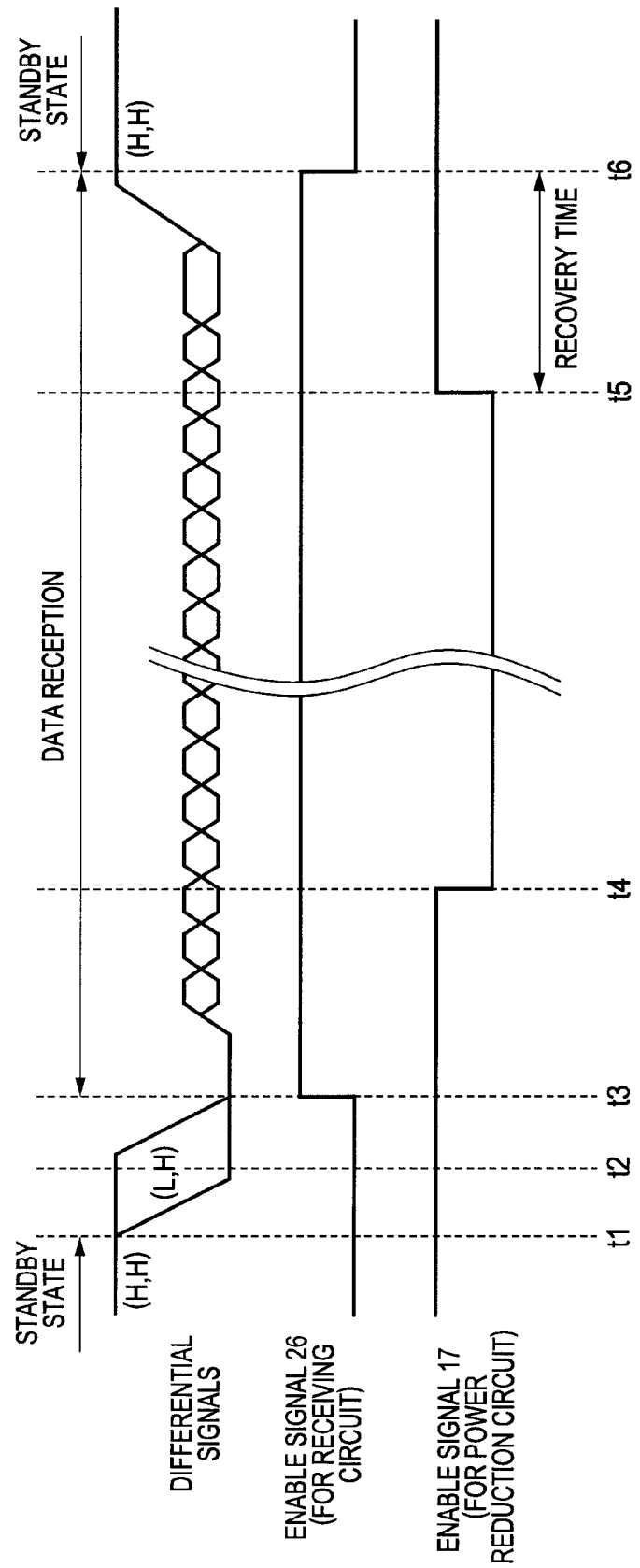
FIG. 4 is a timing chart showing the operation of the data receiving device according to the first embodiment.

The case where the signals 24 and 25 outputted from the single-end buffers 21 and 22 indicate the data reception start refers to, for example, the case where a state in which one of the differential signals 14_1 and 14_2 is at the high level and the other is at the low level (see t2 in FIG. 4) transitions to a state in which both the differential signals 14_1 and 14_2 are at the low level (see t3 in FIG. 4). At this time, the signals 24 and 25 outputted from the single-end buffers 21 and 22 transition from a state in which one of the signals 24 and 25 is at the high level and the other is at the low level to a state in which both the signals 24 and 25 are at the low level. Further, the case where the signals 24 and 25 outputted from the single-end buffers 21 and 22 indicate the data reception end refers to, for example, the case where both the differential signals 14_1 and 14_2 are at the high level. At this time, both the signals 24 and 25 outputted from the single-end buffers 21 and 22 become the high level (see t6 in FIG. 4).

Figure 3:
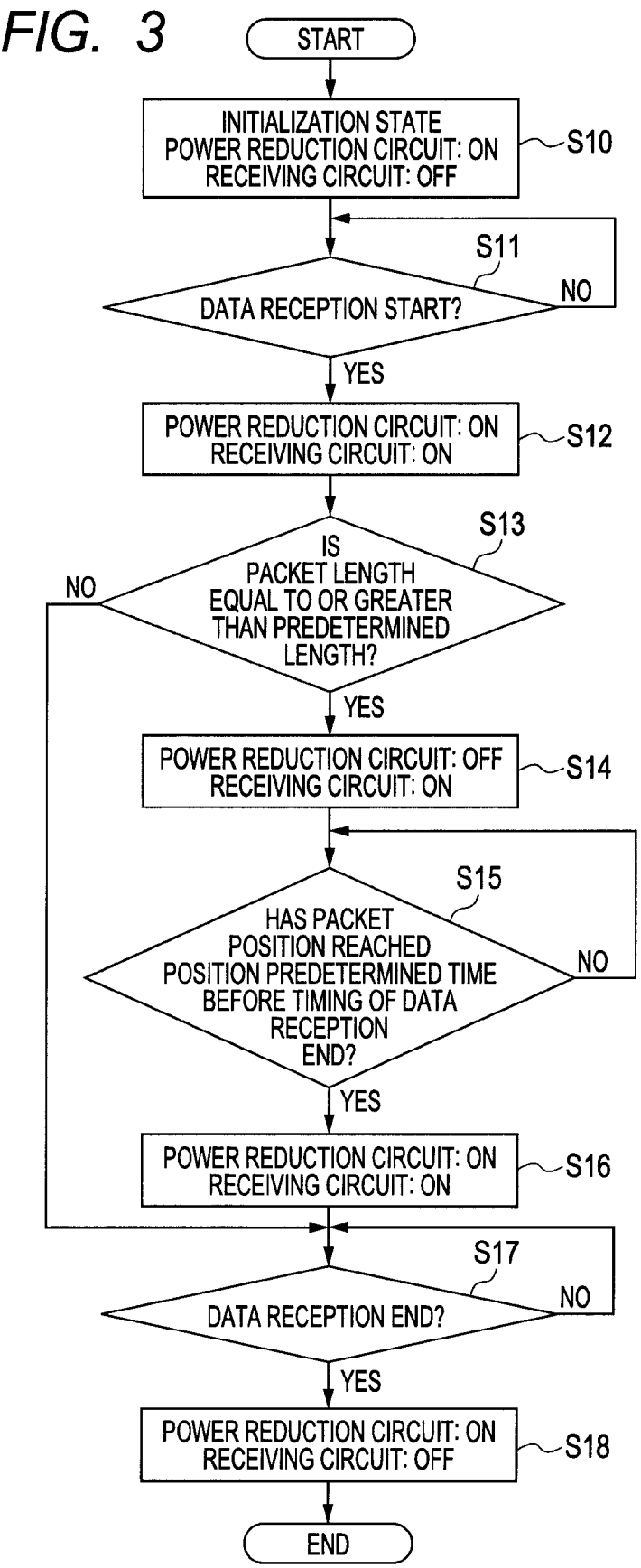
FIG. 3 is a flowchart showing the operation of the data receiving device according to the first embodiment.

Next, the operation of the data receiving device according to this embodiment will be described with reference to FIGS. 1 to 4. FIG. 3 is a flowchart showing the operation of the data receiving device according to this embodiment. FIG. 4 is a timing chart showing the operation of the data receiving device according to this embodiment.

In an initialization state, the power reduction circuit 20 is in the on state, and the receiving circuit 10 is in the off state (step S10). That is, at time t1 in FIG. 4, the enable signal 26 outputted from the state monitoring circuit 23 in the power reduction circuit 20 is at the low level; accordingly, the receiver 11 is in the off state. Further, the enable signal 17 outputted from the control circuit 13 in the receiving circuit 10 is at the high level; accordingly, the single-end buffers 21 and 22 are in the on state. In the initialization state, the power reduction circuit 20 is in the on state and can therefore monitor whether or not the receiving circuit 10 has received data.

Next, it is determined whether data reception is started (step S11). At time t3 in FIG. 4, the state in which one of the differential signals 14_1 and 14_2 is at the high level and the other is at the low level transitions to the state in which both the differential signals 14_1 and 14_2 are at the low level, and the signals 24 and 25 outputted from the single-end buffers 21 and 22 transition from the state in which one of the signals 24 and 25 is at the high level and the other is at the low level to the state in which both the signals 24 and 25 are at the low level. When the state in which one of the signals 24 and 25 is at the high level and the other is at the low level transitions to the state in which both the signals 24 and 25 are at the low level, the state monitoring circuit 23 determines that data reception is started (step S11: YES), and outputs the enable signal 26 of the high level to the receiver 11 at time t3. Thereby, the receiver 11 becomes the on state (step S12).

Next, it is determined, by the enable signal generation circuit 32 in the control circuit 13, whether a packet length acquired by the analysis circuit 31 is equal to or greater than a predetermined length (step S13). If the packet length acquired by the analysis circuit 31 is equal to or greater than the predetermined length (step S13: YES), at time t4 in FIG. 4 the enable signal generation circuit 32 generates the enable signal 17 for putting the single-end buffers 21 and 22 (i.e., power reduction circuit 20) into the off state (i.e., enable signal 17 of the low level), and outputs the enable signal 17 to the single-end buffers 21 and 22 (step S14).

If the packet length acquired by the analysis circuit 31 is greater than the predetermined packet length, the receiving circuit 10 operates for a long period. During this period, the power reduction circuit 20 does not need to monitor data reception in the receiving circuit 10, and can therefore be put into the off state. If the packet length acquired by the analysis circuit 31 is smaller than the predetermined length (step S13: NO), the process proceeds to step S17 without putting the power reduction circuit 20 into the off state.

Next, it is determined, by the enable signal generation circuit 32 in the control circuit 13, whether a packet position acquired by the analysis circuit 31 has reached a position a predetermined time before the timing of the data reception end (step S15). In this context, the position the predetermined time before the timing of the data reception end corresponds to the timing the recovery time 34 (set by the CPU or the like) before the timing of the data reception end (t6 in FIG. 4). The recovery time 34 set by the CPU or the like corresponds to the time interval between time t5 and time t6 in FIG. 4. In the data receiving device according to this embodiment, the single-end buffers 21 and 22 are put into the off state only if the packet length acquired by the analysis circuit 31 is greater than the predetermined packet length. This can prevent time t4 at which the enable signal 17 becomes the low level from coming after time t5 at which the enable signal 17 becomes the high level, and can therefore prevent the data receiving device from malfunctioning.

If the packet position acquired by the analysis circuit 31 has reached the position the predetermined time before the timing of the data reception end (step S15: YES), at time t5 in FIG. 4 the enable signal generation circuit 32 generates the enable signal 17 for putting the single-end buffers 21 and 22 (i.e., power reduction circuit 20) into the on state, and outputs the enable signal 17 to the single-end buffers 21 and 22 (step S16).

Next, it is determined whether data reception has ended (step S17). At time t6 in FIG. 4, both the differential signals 14_1 and 14_2 become the high level, and both the signals 24 and 25 outputted from the single-end buffers 21 and 22 become the high level. When both the signals 24 and 25 become the high level, the state monitoring circuit 23 determines that data reception has ended (step S17: YES), and outputs the enable signal 26 of the low level to the receiver 11. Thereby, the receiver 11 becomes the off state (step S18), so that the process returns to the initialization state (corresponding to step S10) and repeats steps S10 to S18.

As described above, in the data receiving device according to this embodiment, the power reduction circuit 20 puts the receiver 11 into the on state in accordance with the timing of the data reception start by the receiving circuit 10, and puts the receiver 11 into the off state in accordance with the timing of the data reception end by the receiving circuit 10. Further, the control circuit 13 in the receiving circuit 10 puts the power reduction circuit 20 into the off state in accordance with the timing of the data reception start by the receiving circuit 10, and puts the power reduction circuit 20 into the on state in accordance with the timing of the data reception end by the receiving circuit 10. Therefore, it is possible to put the power reduction circuit 20 into the off state in addition to the receiver 11 and accordingly reduce the power consumption of the data receiving device.

In the technique disclosed in Patent Document 1, the port monitor circuit 161 monitors the state of the serial bus ($D^+$, $D^-$). When data is not transferred through the serial bus ($D^+$, $D^-$), the differential input buffer 159 is put into the off state, thereby reducing the power consumption of the USB controller.

However, in the technique disclosed in Patent Document 1, the port monitor circuit 161 is always in the on state to monitor the state of the serial bus ($D^+$, $D^-$). Accordingly, the port monitor circuit 161 always consumes power, which disadvantageously leads to insufficient reduction in the power consumption of the USB controller.

On the other hand, in the data receiving device according to this embodiment, the state monitoring circuit 23 in the power reduction circuit 20 monitors whether or not data is contained in the differential signals 14_1 and 14_2, and puts the receiver 11 into the off state when data is not contained in the differential signals 14_1 and 14_2. In addition to this, in the data receiving device according to this embodiment, if the packet length of data transferred by the differential signals 14_1 and 14_2 is greater than the predetermined packet length, the control circuit 13 puts the single-end buffers 21 and 22 (i.e., power reduction circuit 20) into the off state.

Thus, in the data receiving device according to this embodiment, it is possible to put the single-end buffers 21 and 22 (i.e., power reduction circuit 20) into the off state in addition to the receiver 11 and accordingly reduce the power consumption of the data receiving device.

Second Embodiment

Figure 5:
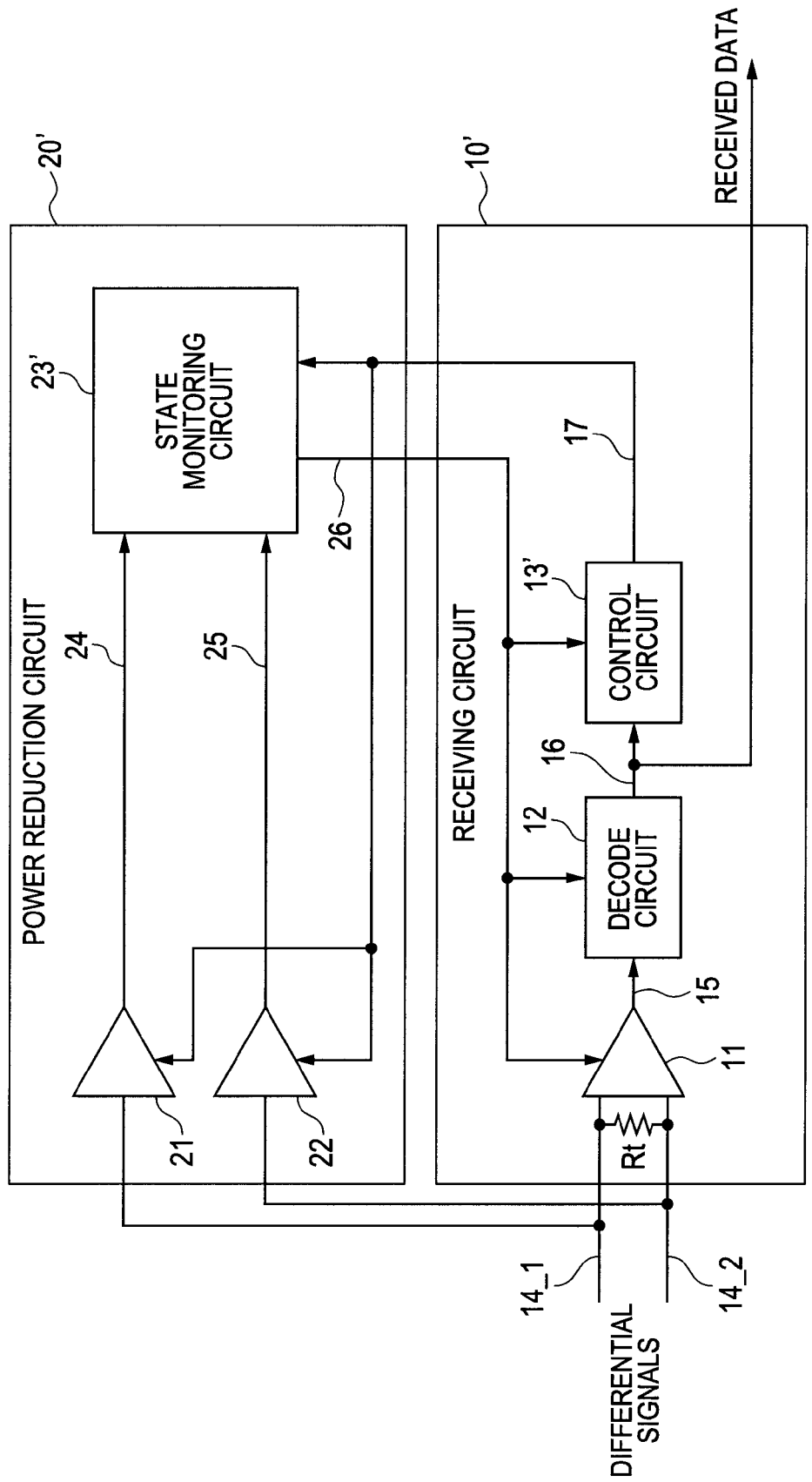
FIG. 5 is a block diagram showing a data receiving device according to a second embodiment.

Next, a second embodiment of the invention will be described. FIG. 5 is a block diagram showing a data receiving device according to the second embodiment of the invention. The data receiving device according to this embodiment differs from the data receiving device according to the first embodiment in that the enable signal 17 outputted from a control circuit 13' in a receiving circuit 10' is supplied to a state monitoring circuit 23' as well as to the single-end buffers 21 and 22 and the enable signal 26 outputted from the state monitoring circuit 23' in a power reduction circuit 20' is supplied to the decode circuit 12 and the control circuit 13' as well as to the receiver 11. The other configuration is the same as that of the data receiving device according to the first embodiment described with reference to FIGS. 1 to 4. The same components are denoted by the same reference numerals, and their description will not be repeated.

If the packet length of data contained in the differential signals 14_1 and 14_2 is equal to or greater than the predetermined length (step S13 in FIG. 3: YES), the control circuit 13' in the receiving circuit 10' outputs the enable signal 17 of the low level to the single-end buffers 21 and 22 and the state monitoring circuit 23'. Thereby, the single-end buffers 21 and 22 and the state monitoring circuit 23' in the power reduction circuit 20' become the off state.

If the packet position of data contained in the differential signals 14_1 and 14_2 has reached the position the predetermined time before the timing of the data reception end (step S15 in FIG. 3: YES), the control circuit 13' outputs the enable signal 17 of the high level to the single-end buffers 21 and 22 and the state monitoring circuit 23'. Thereby, the single-end buffers 21 and 22 and the state monitoring circuit 23' in the power reduction circuit 20' become the on state.

If data reception is started (step S11 in FIG. 3: YES), the state monitoring circuit 23' in the power reduction circuit 20' outputs the enable signal 26 of the high level to the receiver 11, the decode circuit 12, and the control circuit 13'. Thereby, the receiver 11, the decode circuit 12, and the control circuit 13' become the on state (step S12).

Further, at time t6 in FIG. 4 if the state monitoring circuit 23' determines that data reception has ended (step S17 in FIG. 3: YES), the state monitoring circuit 23' outputs the enable signal 26 of the low level to the receiver 11, the decode circuit 12, and the control circuit 13'. Thereby, the receiver 11, the decode circuit 12, and the control circuit 13' become the off state (step S18 in FIG. 3).

Thus, in the data receiving device according to this embodiment, it is possible to put the state monitoring circuit 23' into the off state in addition to the single-end buffers 21 and 22 at the time of putting the power reduction circuit 20' into the off state. Further, it is possible to put the decode circuit 12 and the control circuit 13' into the off state in addition to the receiver 11 at the time of putting the receiving circuit 10' into the off state. Therefore, it is possible to further reduce the power consumption, compared to the data receiving device according to the first embodiment.

Further, while in the receiving device according to this embodiment, the decode circuit 12 and the control circuit 13' are put into the off state in addition to the receiver 11, for example at least one of the decode circuit 12 and the control circuit 13' may be put into the off state in addition to the receiver 11. That is, the receiver 11 and the decode circuit 12 may be put into the off state, or the receiver 11 and the control circuit 13' may be put into the off state.

Third Embodiment

Figure 6:
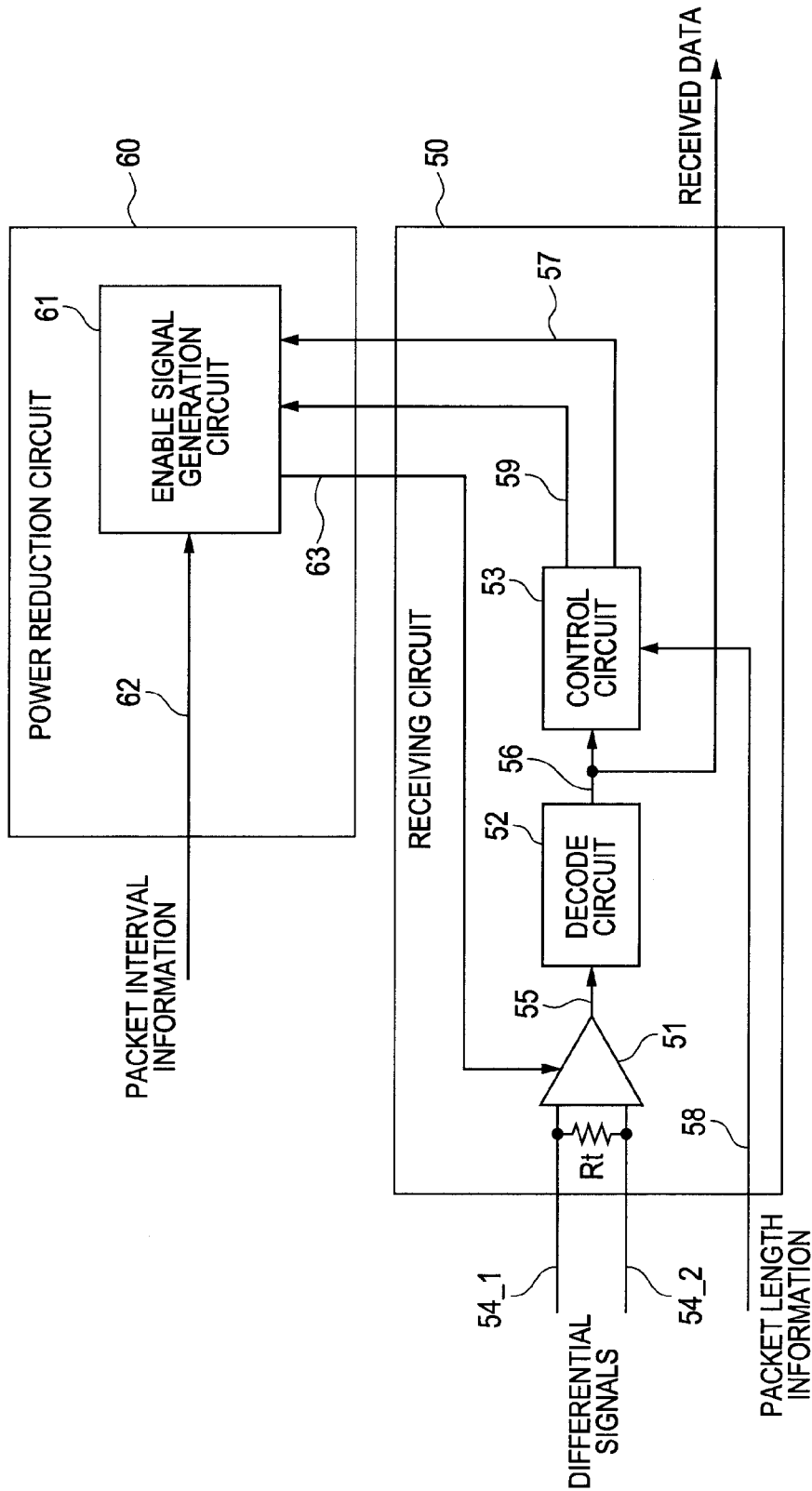
FIG. 6 is a block diagram showing a data receiving device according to a third embodiment.

Next, a third embodiment of the invention will be described. FIG. 6 is a block diagram showing a data receiving device according to the third embodiment of the invention. The data receiving device according to this embodiment can be used for reception of data transmitted at regular intervals such as image data. In the data transmitted at regular intervals, it is possible to know the packet length of the data and the packet interval (interval between packets) beforehand. In the data receiving device according to this embodiment, information about such previously known packet length and packet interval can be set from an external circuit such as a CPU.

The data receiving device shown in FIG. 6 has a receiving circuit 50 and a power reduction circuit 60. The receiving circuit 50 includes a receiver 51, a decode circuit 52, and a control circuit 53.

The receiver 51 receives differential signals 54_1 and 54_2, and outputs a signal 55 of the high level or the low level in accordance with the differential signals 54_1 and 54_2. For example, when the differential signal 54_1 is at the high level and the differential signal 54_2 is at the low level, the receiver 51 outputs the signal 55 of the high level. On the other hand, when the differential signal 54_1 is at the low level and the differential signal 54_2 is at the high level, the receiver 51 outputs the signal 55 of the low level. The termination resistor Rt is provided on the input side of the receiver 51.

Further, an enable signal 63 outputted from an enable signal generation circuit (third enable signal generation circuit) 61 in the power reduction circuit 60 is supplied to the receiver 51. The receiver 51 becomes the on state at the high level of the enable signal 63. At this time, the receiver 51 receives the differential signals 54_1 and 54_2, and outputs the signal 55 of the high level or the low level in accordance with the differential signals 54_1 and 54_2. On the other hand, the receiver 51 becomes the off state at the low level of the enable signal 63. At this time, the receiver 51 does not output the signal 55. Further, besides the above example, the receiver 51 may become the on state at the low level of the enable signal 63, and become the off state at the high level of the enable signal 63.

The decode circuit 52 decodes the signal 55 outputted from the receiver 51. That is, the decode circuit 52 decodes the signal 55 transferred by the differential signals 54_1 and 54_2 into data having a predetermined bit length. Data 56 decoded by the decode circuit 52 is supplied to the control circuit 53, and outputted to a subsequent external circuit (not shown).

The control circuit 53 receives the data 56 outputted from the decode circuit 52 and packet length information set by the CPU or the like, and outputs an enable signal 57 and a synchronization signal 59 to the enable signal generation circuit 61 in the power reduction circuit 60.

That is, the control circuit 53 puts the power reduction circuit 60 into the off state in accordance with the timing of a data reception start by the receiving circuit 50, and puts the power reduction circuit 60 into the on state in accordance with the timing of a data reception end by the receiving circuit 50. In other words, the control circuit 53 puts the power reduction circuit 60 into the off state in accordance with the timing at which data is contained in the differential signals 54_1 and 54_2, and puts the power reduction circuit 60 into the on state in accordance with the timing at which data is not contained in the differential signals 54_1 and 54_2. In this context, the case where data is contained in the differential signals 54_1 and 54_2 refers to the case where data is transferred to the data receiving device from an external data transmitting device (not shown), using the differential signals 54_1 and 54_2. On the other hand, the case where data is not contained in the differential signals 54_1 and 54_2 refers to, for example, the case where the differential signals 54_1 and 54_2 are fixed. In the case where data is contained in the differential signals 54_1 and 54_2, the decode circuit 52 outputs the decoded data 56. On the other hand, in the case where data is not contained in the differential signals 54_1 and 54_2, the decode circuit 52 does not output the data 56.

Specifically, the control circuit 53 outputs the enable signal 57 of the high level to the enable signal generation circuit 61 in the power reduction circuit 60, thereby putting the enable signal generation circuit 61 into the on state (i.e., the power reduction circuit 60 into the on state). Further, the control circuit 53 outputs the enable signal 57 of the low level to the enable signal generation circuit 61 in the power reduction circuit 60, thereby putting the enable signal generation circuit 61 into the off state (i.e., the power reduction circuit 60 into the off state). Further, besides the above example, the enable signal generation circuit 61 may become the on state at the low level of the enable signal 57, and become the off state at the high level of the enable signal 57.

Figure 7:
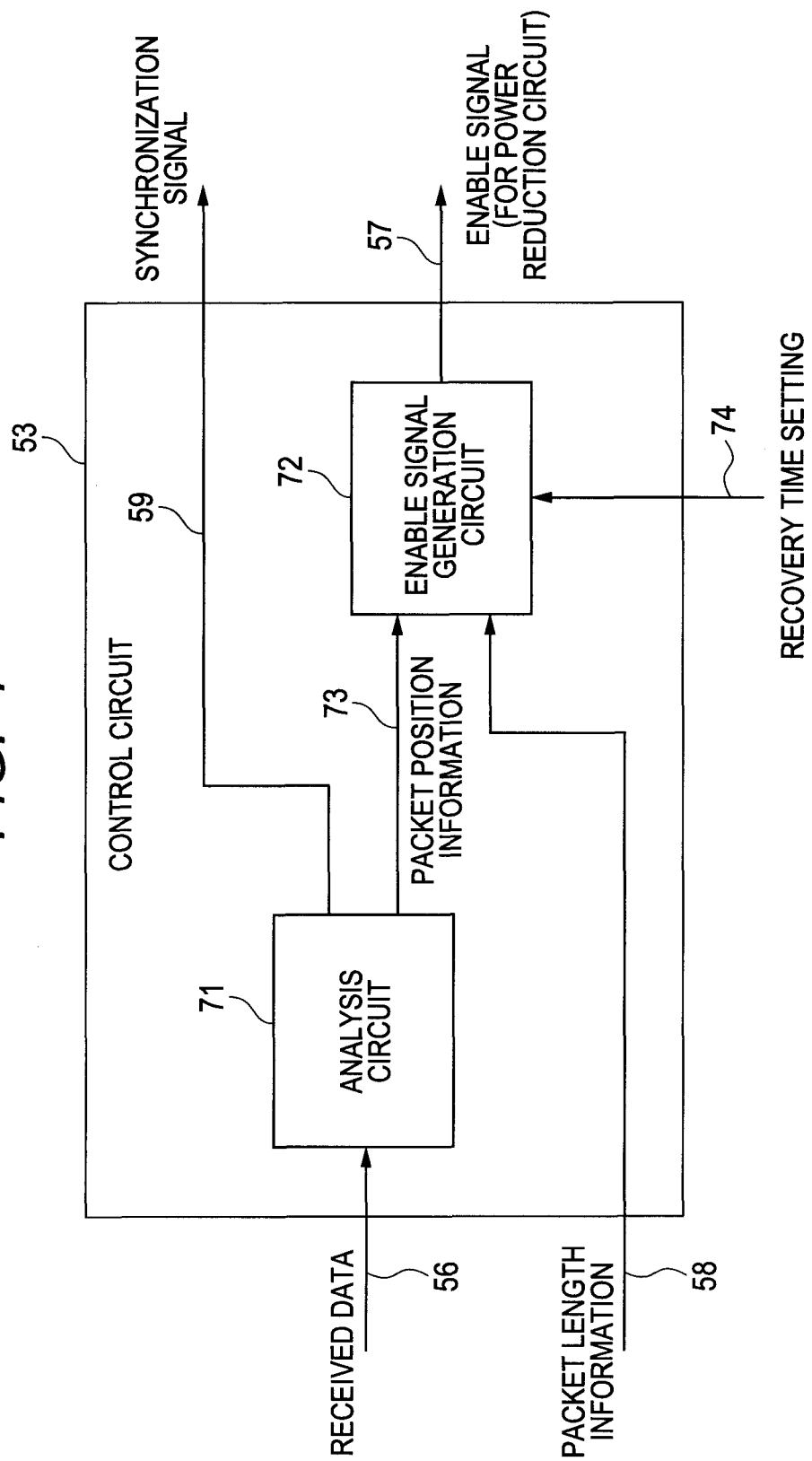
FIG. 7 is a block diagram showing an example of a control circuit in the data receiving device according to the third embodiment.

FIG. 7 is a block diagram showing an example of the control circuit 53. As shown in FIG. 7, the control circuit 53 has an analysis circuit 71 and an enable signal generation circuit (second enable signal generation circuit) 72. The analysis circuit 71 analyzes the packet of the data 56 outputted from the decode circuit 52 and thereby acquires information about the packet position of the currently-received data 56. For example, the analysis circuit 71 analyzes what number bit the data 56 outputted from the decode circuit 52 is and thereby acquires information about the packet position. Further, the analysis circuit 71 acquires data reception start timing and data reception end timing from the synchronization code of the data 56 outputted from the decode circuit 52. The information about the reception start timing is sent to the enable signal generation circuit 72. Further, the analysis circuit 71 generates the synchronization signal 59 indicating the reception end timing, and outputs it to the enable signal generation circuit 61 in the power reduction circuit 60.

The enable signal generation circuit 72 generates the enable signal 57, based on information 73 (information about the packet position and information about the reception start timing) outputted from the analysis circuit 71 and the packet length information 58 and the recovery time 74 set by the CPU (not shown) or the like.

Specifically, the enable signal generation circuit 72 generates the enable signal 57 for putting the enable signal generation circuit 61 in the power reduction circuit 60 into the off state if the packet length set by the CPU (not shown) or the like is greater than a predetermined packet length.

Further, the enable signal generation circuit 72 generates the enable signal 57 for putting the enable signal generation circuit 61 in the power reduction circuit 60 into the on state when the packet position acquired by the analysis circuit 71 has reached a position a predetermined time before the timing of the data reception end. In this context, the position the predetermined time before the timing of the data reception end corresponds to the recovery time of the power reduction circuit 60.

The power reduction circuit 60 shown in FIG. 6 is a circuit for reducing the power consumption of the receiving circuit 50. The power reduction circuit 60 includes the enable signal generation circuit 61. The enable signal generation circuit 61 generates the enable signal 63 in accordance with packet interval information 62 set by the CPU (not shown) or the like and the synchronization signal 59 outputted from the control circuit 53 in the receiving circuit 50, and outputs the enable signal 63 to the receiver 51. That is, the enable signal generation circuit 61 puts the receiver 51 into the off state in accordance with the synchronization signal 59, and generates the enable signal 63 for putting the receiver 51 into the on state in accordance with the packet interval information 62 (i.e., in accordance with a blank period in FIG. 10) after putting the receiver 51 into the off state.

Figure 8:
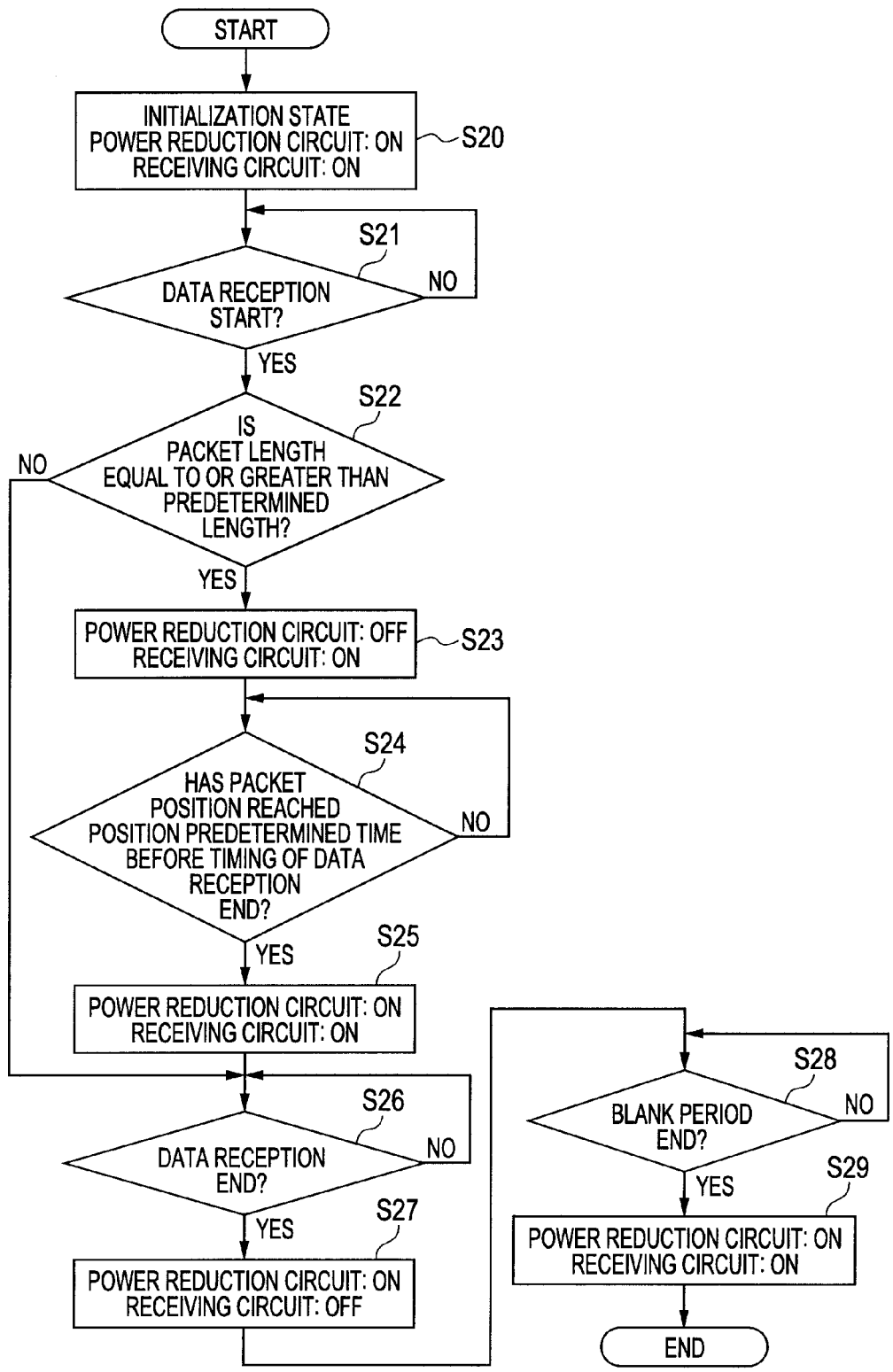
FIG. 8 is a flowchart showing the operation of the data receiving device according to the third embodiment.
Figure 9:
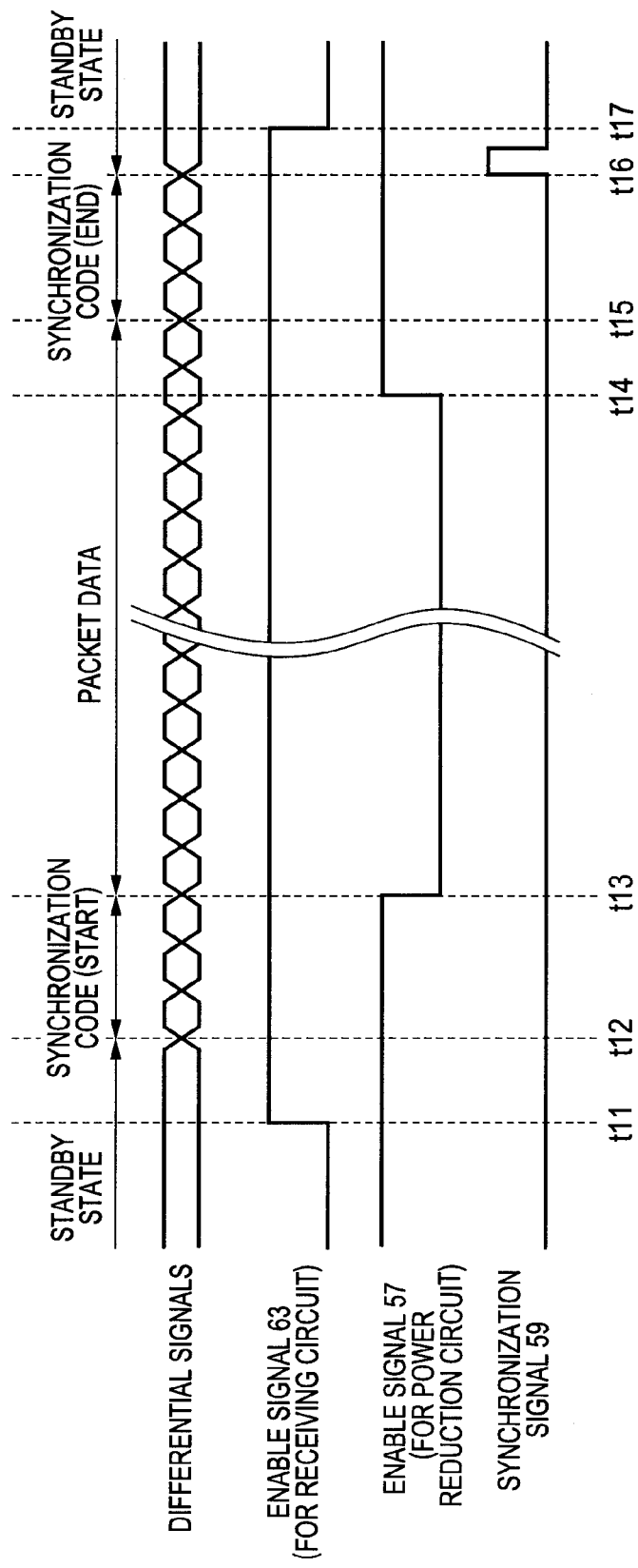
FIG. 9 is a timing chart showing the operation of the data receiving device according to the third embodiment.
Figure 10:
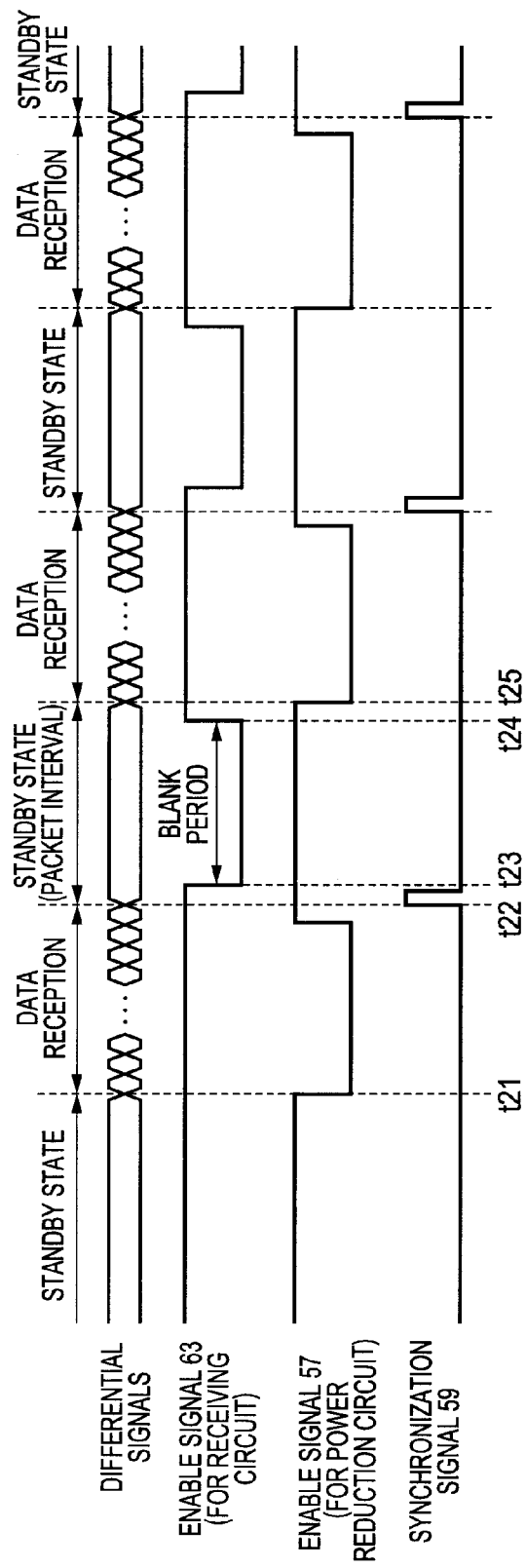
FIG. 10 is a timing chart showing the operation of the data receiving device according to the third embodiment.

Next, the operation of the data receiving device according to this embodiment will be described with reference to FIGS. 6 to 10. FIG. 8 is a flowchart showing the operation of the data receiving device according to this embodiment. FIGS. 9 and 10 are timing charts showing the operation of the data receiving device according to this embodiment.

In an initialization state, the receiving circuit 50 and the power reduction circuit 60 are in the on state (step S20). That is, at time t11 in FIG. 9, the enable signal 63 outputted from the enable signal generation circuit 61 in the power reduction circuit 60 becomes the high level, and the receiver 51 becomes the on state. Further, the enable signal 57 outputted from the control circuit 53 in the receiving circuit 50 is at the high level; accordingly, the enable signal generation circuit 61 in the power reduction circuit 60 is in the on state. The initialization state corresponds to a state immediately before time t21 in FIG. 10.

Next, it is determined whether data reception is started (step S21). At time t12 in FIG. 9, when the receiving circuit 50 receives a synchronization code (START) indicating a data reception start, the analysis circuit 71 in the control circuit 53 outputs a signal indicating the data reception start to the enable signal generation circuit 72 (step S21: YES).

Next, it is determined, by the enable signal generation circuit 72 in the control circuit 53, whether a packet length set by the CPU or the like is equal to or greater than a predetermined length (step S22). If the packet length set by the CPU or the like is equal to or greater than the predetermined length (step S22: YES), at time t13 in FIG. 9 the enable signal generation circuit 72 generates the enable signal 57 for putting the enable signal generation circuit 61 (i.e., power reduction circuit 60) into the off state, and outputs the enable signal 57 to the enable signal generation circuit 61 (step S23).

If the packet length set by the CPU (not shown) or the like is greater than the predetermined packet length, the receiving circuit 50 operates for a long period. During this period, the power reduction circuit 60 does not need to put the receiving circuit 50 into the off state, which can put the power reduction circuit 60 into the off state. This can reduce the power consumption of the power reduction circuit 60. If the packet length set by the CPU or the like is smaller than the predetermined length (step S22: NO), the process proceeds to step S26 without putting the power reduction circuit 60 into the off state.

Next, it is determined, by the enable signal generation circuit 72 in the control circuit 53, whether a packet position acquired by the analysis circuit 71 has reached a position a predetermined time before the timing of the data reception end (step S24). In this context, the position the predetermined time before the timing of the data reception end (t16 in FIG. 9) corresponds to the timing the recovery time 74 (set by the CPU or the like) before the timing of the data reception end. The recovery time 74 set by the CPU or the like corresponds to the time interval between time t14 and time t16 in FIG. 9. In the data receiving device according to this embodiment, the power reduction circuit 60 is put into the off state only if the packet length is greater than the predetermined packet length. This can prevent time t13 at which the enable signal 57 becomes the low level from coming after time t14 at which the enable signal 57 becomes the high level, and can therefore prevent the data receiving device from malfunctioning.

If the packet position acquired by the analysis circuit 71 has reached the position the predetermined time before the timing of the data reception end (step S24: YES), at time t14 in FIG. 9 the enable signal generation circuit 72 generates the enable signal 57 for putting the enable signal generation circuit 61

(i.e., power reduction circuit 60) into the on state, and outputs the enable signal 57 to the enable signal generation circuit 61 (step S25).

Next, it is determined whether data reception has ended (step S26). At time t15 in FIG. 9, when the receiving circuit 50 receives a synchronization code (END) indicating a data reception end, the analysis circuit 71 determines that data reception has ended (step S26: YES). Further, at time t16, the analysis circuit 71 outputs the synchronization signal 59 of the high level to the enable signal generation circuit 61 in the power reduction circuit 60.

When the synchronization signal 59 of the high level is supplied to the enable signal generation circuit 61, the enable signal generation circuit 61 outputs the enable signal 63 of the low level to the receiver 51 at time t17. Thereby, the receiver 51 becomes the off state (step S27). In FIG. 9, time t16 at which the synchronization signal 59 of the high level is outputted from the analysis circuit 71 corresponds to time t22 in FIG. 10. Further, time t17 at which the enable signal 63 of the low level is outputted from the enable signal generation circuit 61 corresponds to time t23 in FIG. 10.

Next, the enable signal generation circuit 61 determines whether a blank period has ended (step S28). That is, when a predetermined blank period has elapsed (step S28: YES) from time t23 at which the enable signal 63 of the low level is outputted, the enable signal generation circuit 61 outputs the enable signal 63 of the high level (time t24). Thereby, the receiver 51 (receiving circuit 50) becomes the on state (step S29), so that the process returns to the initialization state and repeats steps S20 to S29.

In this context, the blank period is a period from time t23 at which the enable signal 63 becomes the low level to time t24 a predetermined time before time t25 of reception of the next data. The blank period can be determined based on the packet interval information supplied to the enable signal generation circuit 61. That is, the enable signal generation circuit 61 can know the time of reception of the next data through the inputted packet interval information; accordingly, the enable signal generation circuit 61 can set the enable signal 63 to the high level before the time of reception of the next data and thereby put the receiver 51 into the on state. In other words, the enable signal generation circuit 61 can put the receiver 51 into the on state in accordance with the packet interval information supplied to the power reduction circuit.

The data receiving device according to this embodiment is used for reception of data transmitted at regular intervals such as image data. In the data transmitted at regular intervals, it is possible to know the packet length of the data and the packet interval beforehand. In the data receiving device according to this embodiment, information about such previously known packet length and packet interval can be set from the external circuit such as the CPU. Further, since synchronization codes are provided at the start and end of packet data, it is possible to detect the data reception start and the data reception end, using the analysis circuit 71. Accordingly, it is possible to eliminate the single-end buffers 21 and 22 in the power reduction circuit 20 according to the first and second embodiments. Further, it is possible to put the enable signal generation circuit 61 (i.e., power reduction circuit 60) into the off state in addition to the receiver 51 and accordingly reduce the power consumption of the data receiving device.

Fourth Embodiment

Figure 11:
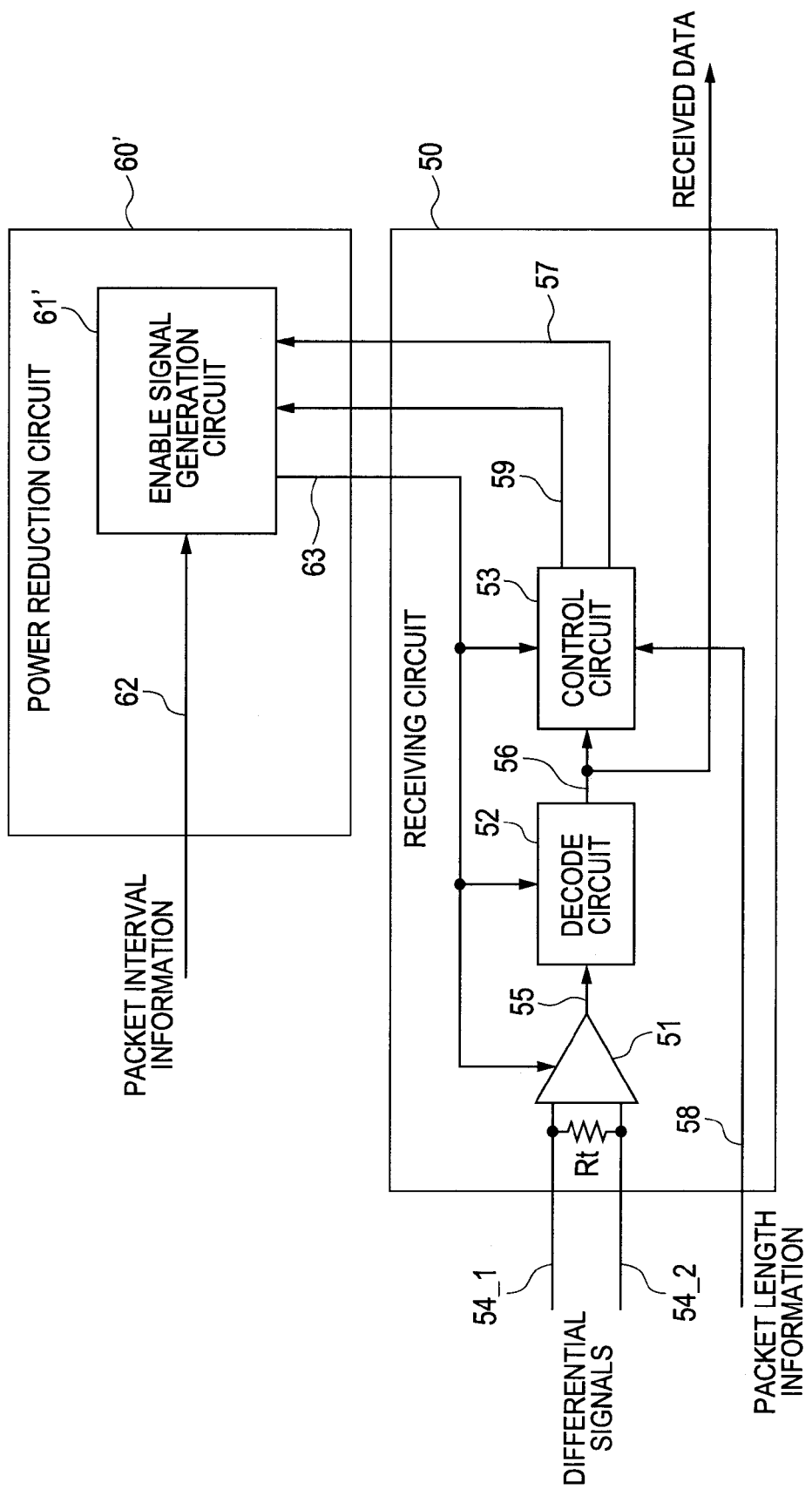
FIG. 11 is a block diagram showing a data receiving device according to a fourth embodiment.

Next, a fourth embodiment of the invention will be described. FIG. 11 is a block diagram showing a data receiving device according to the fourth embodiment of the invention. The data receiving device according to this embodiment differs from the data receiving device according to the third embodiment in that the enable signal 63 outputted from an enable signal generation circuit 61' in a power reduction circuit 60' is supplied to the decode circuit 52 and the control circuit 53 as well as to the receiver 51. The other configuration is the same as that of the data receiving device according to the third embodiment described with reference to FIGS. 6 to 10. The same components are denoted by the same reference numerals, and their description will not be repeated.

In the initialization state (at time t11 in FIG. 9), the enable signal generation circuit 61' in the power reduction circuit 60' outputs the enable signal 63 of the high level to the receiver 51, the decode circuit 52, and the control circuit 53. Thereby, the receiver 51, the decode circuit 52, and the control circuit 53 become the on state.

Further, when the synchronization signal 59 of the high level is supplied to the enable signal generation circuit 61' in the power reduction circuit 60', the enable signal generation circuit 61' outputs the enable signal 63 of the low level to the receiver 51, the decode circuit 52, and the control circuit 53. Thereby, the receiver 51, the decode circuit 52, and the control circuit 53 become the off state (step S27).

Thus, in the data receiving device according to this embodiment, it is possible to put the decode circuit 52 and the control circuit 53 into the off state in addition to the receiver 51 at the time of putting the receiving circuit 50' into the off state. Therefore, it is possible to further reduce the power consumption, compared to the data receiving device according to the third embodiment.

Further, while in the receiving device according to this embodiment, the decode circuit 52 and the control circuit 53 are put into the off state in addition to the receiver 51, for example at least one of the decode circuit 52 and the control circuit 53 may be put into the off state in addition to the receiver 51. That is, the receiver 51 and the decode circuit 52 may be put into the off state, or the receiver 51 and the control circuit 53 may be put into the off state.

Fifth Embodiment

Figure 12:
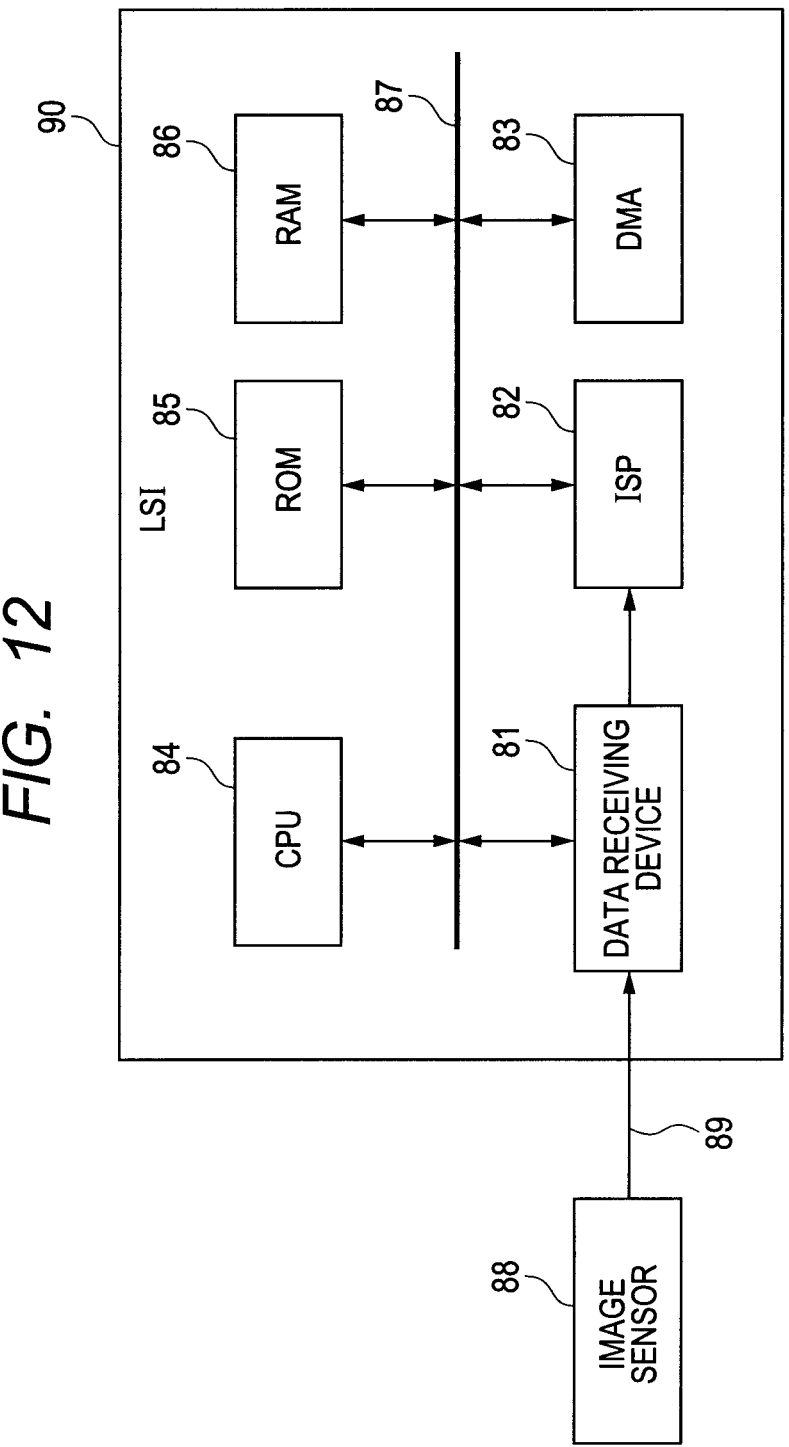
FIG. 12 is a block diagram showing a semiconductor integrated circuit according to a fifth embodiment.
Figure 13:
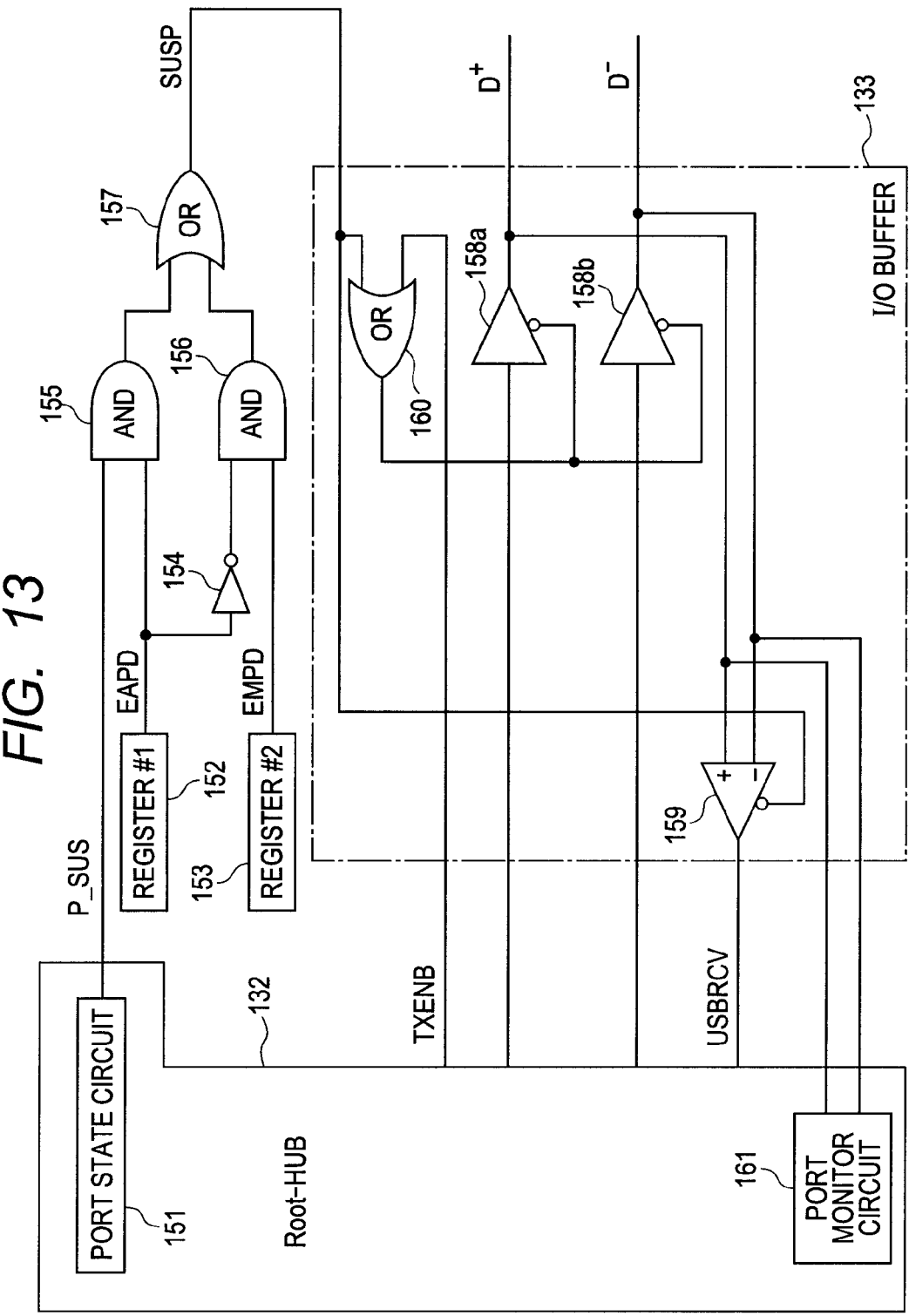
FIG. 13 is a diagram for explaining the technique disclosed in Patent Document 1.

Next, a fifth embodiment of the invention will be described. FIG. 12 is a block diagram showing a semiconductor integrated circuit (LSI) according to this embodiment. The semiconductor integrated circuit 90 shown in FIG. 12 has a data receiving device 81, an ISP (Image Signal Processor) 82, a DMA (Direct Memory Access) 83, a CPU 84, a ROM 85, and a RAM 86. These circuits are coupled to each other through a common bus 87.

In FIG. 12, the data receiving device described in the first to fourth embodiments can be used as the data receiving device 81. Data 89 acquired by an image sensor (e.g., CCD, CMOS) 88 provided outside the semiconductor integrated circuit 90 is supplied to the data receiving device 81. The data 89 outputted from the image sensor 88 is transferred to the data receiving device 81, using differential signals. The transferred data 89 is received by the data receiving device 81 and then transferred to the ISP 82. The ISP 82 is an image processing processor and can therefore process at high speed the image signal acquired by the image sensor 88.

In this embodiment, by using e.g. an MIPI interface for data transfer from the image sensor 88 to the semiconductor integrated circuit 90, it is possible to transfer image data at high speed. Further, by using the data receiving device described in the first to fourth embodiments as the data receiving device 81, it is possible to reduce the power consumption of the semiconductor integrated circuit 90.

The semiconductor integrated circuit 90 according to this embodiment can be incorporated in devices requiring image processing such as a digital camera and a cellular phone.

Further, the data receiving device described in the first to fourth embodiments can be used as a device for transferring data using differential signals with a high-speed serial interface such as USB and HDMI besides MIPI.

While the invention has been described based on the illustrated embodiments, the present invention is not limited to the configurations of the embodiments. It is obvious that those skilled in the art can make various changes, modifications, and combinations within the scope of the invention as defined in the appended claims.

What is claimed is:

1. A data receiving device comprising:
a receiving circuit including a receiver that receives differential signals, a decode circuit that decodes a signal outputted from the receiver, and a control circuit to which data outputted from the decode circuit is supplied; and
a power reduction circuit that reduces power consumption of the receiving circuit,
wherein the power reduction circuit puts the receiver into an on state in accordance with timing of a data reception start by the receiving circuit, and puts the receiver into an off state in accordance with timing of a data reception end by the receiving circuit,
wherein the control circuit puts the power reduction circuit into an off state in accordance with the timing of the data reception start by the receiving circuit, and puts the power reduction circuit into an on state in accordance with the timing of the data reception end by the receiving circuit,
wherein the power reduction circuit includes
a first single-end buffer to which one of the differential signals is supplied;
a second single-end buffer to which the other differential signal is supplied; and
a state monitoring circuit which puts the receiver into the on state or the off state in accordance with output from the first and second single-end buffers, and
wherein the control circuit in the receiving circuit includes
an analysis circuit that analyzes a packet of data outputted from the decode circuit and acquires a packet length of the data; and
a first enable signal generation circuit that generates an enable signal for putting the first and second single-end buffers into an off state if the packet length acquired by the analysis circuit is greater than a predetermined packet length.

2. The data receiving device according to claim 1,
wherein the analysis circuit further acquires a packet position of currently-received data, and
wherein the first enable signal generation circuit generates an enable signal for putting the first and second single-end buffers into an on state when the packet position acquired by the analysis circuit has reached a position a predetermined time before the timing of the data reception end.

3. The data receiving device according to claim 1,
wherein the state monitoring circuit is put into an off state in synchronization with timing of putting the first and second single-end buffers into the off state, and the state monitoring circuit is put into an on state in synchronization with timing of putting the first and second single-end buffers into the on state.

4. A data receiving device comprising:
a receiving circuit including a receiver that receives differential signals, a decode circuit that decodes a signal outputted from the receiver, and a control circuit to which data outputted from the decode circuit is supplied; and
a power reduction circuit that reduces power consumption of the receiving circuit,
wherein the power reduction circuit puts the receiver into an on state in accordance with timing of a data reception start by the receiving circuit, and puts the receiver into an off state in accordance with timing of a data reception end by the receiving circuit,
wherein the control circuit puts the power reduction circuit into an off state in accordance with the timing of the data reception start by the receiving circuit, and puts the power reduction circuit into an on state in accordance with the timing of the data reception end by the receiving circuit
wherein the control circuit in the receiving circuit includes
an analysis circuit that acquires timing of a data reception start from a synchronization code of the data outputted from the decode circuit; and
a second enable signal generation circuit that generates an enable signal for putting the power reduction circuit into the off state in accordance with the timing of the data reception start acquired by the analysis circuit, and
wherein information about a packet length of the data is supplied to the second enable signal generation circuit, and the second enable signal generation circuit generates the enable signal for putting the power reduction circuit into the off state if the packet length is greater than a predetermined packet length.

5. A data receiving device comprising:
a receiving circuit including a receiver that receives differential signals, decode circuit that decodes a signal outputted from the receiver, and a control circuit to which data outputted from the decode circuit is supplied; and
a power reduction circuit, that reduces power consumption of the receiving circuit,
wherein the power reduction circuit puts the receiver into an on state in accordance with timing of a data reception start by the receiving circuit, and puts the receiver into an off state in accordance with timing of a data reception end by the receiving circuit,
wherein the control circuit puts the power reduction circuit into an off state in accordance with the timing of the data reception start by the receiving circuit, and puts the power reduction circuit into an on state in accordance with the timing of the data reception end. by the receiving circuit
wherein the control circuit in the receiving circuit includes
an analysis circuit that acquires timing of a data reception start from a synchronization code of the data outputted from the decode circuit; and
a second enable signal generation circuit that generates an enable signal for putting the power reduction. circuit into the off state in accordance with the timing of the data reception start acquired by the analysis circuit,
wherein the analysis circuit further acquires a packet position of currently-received data, and
wherein the second enable signal generation circuit generates an enable signal for putting the power reduction circuit into an on state when the packet position acquired by the analysis circuit has reached a position a predetermined time before timing of a data reception end obtained from the packet length.

* * * * *